United States Patent [19]

Ehrhart et al.

[11] Patent Number: 5,077,330

[45] Date of Patent: Dec. 31, 1991

[54] CONDUCTIVE POLYURETHANE-UREA/POLYETHYLENE OXIDE

[75] Inventors: Wendell A. Ehrhart, Red Lion; Nowaf Halout, Lancaster; Kenneth K. Ko, West Grove; David A. Smith, York, all of Pa.

[73] Assignee: Armstrong World Industries, Inc., Lancaster, Pa.

[21] Appl. No.: 518,248

[22] Filed: May 4, 1990

Related U.S. Application Data

[63] Continuation of Ser. No. 237,315, Aug. 29, 1988, abandoned.

[51] Int. Cl.$^5$ .................... C08G 18/48; C09D 175/08; C08L 75/08
[52] U.S. Cl. .................... 524/314; 524/394; 524/401; 524/425; 524/777; 524/779; 524/839; 524/910; 524/912; 524/914; 525/129; 521/119; 521/125; 521/174; 521/176; 528/76
[58] Field of Search .................... 528/76; 521/119, 125, 521/174, 176; 525/129; 524/314, 394, 401, 425, 777, 779, 839, 910, 912, 914

[56] References Cited

U.S. PATENT DOCUMENTS

| | | | |
|---|---|---|---|
| 3,041,295 | 6/1962 | Wiech et al. | 521/107 |
| 3,505,275 | 4/1970 | Sato | 524/779 |
| 3,661,627 | 5/1972 | Schwarz | 117/118 |
| 3,743,620 | 7/1973 | Frye | 524/401 |
| 3,852,255 | 12/1974 | Bentz et al. | 524/199 |
| 3,891,718 | 6/1975 | Wolf et al. | 260/859 R |
| 3,893,979 | 7/1975 | Wolf et al. | 260/77.5 AQ |
| 3,911,047 | 10/1975 | Wolf et al. | 260/859 R |
| 4,029,694 | 6/1977 | Weipert et al. | 260/475 P |
| 4,115,605 | 9/1978 | Hultman et al. | 427/377 |
| 4,118,354 | 10/1978 | Harada et al. | 260/29.2 TN |
| 4,137,200 | 1/1979 | Wood et al. | 521/159 |
| 4,145,515 | 3/1979 | Pogozelski et al. | 528/77 |
| 4,208,507 | 6/1980 | Stutz et al. | 528/64 |
| 4,235,988 | 11/1980 | Fildes et al. | 528/79 |
| 4,254,176 | 3/1981 | Müller et al. | 428/220 |
| 4,314,924 | 2/1982 | Haubennestel et al. | 260/30.6 R |
| 4,381,332 | 4/1983 | Fulmer et al. | 428/288 |
| 4,426,488 | 1/1984 | Wyman | 524/783 |
| 4,439,552 | 3/1984 | Dedolph | 521/159 |
| 4,496,708 | 1/1985 | Dehm et al. | 528/76 |
| 4,569,981 | 2/1986 | Wenzel et al. | 528/67 |
| 4,582,873 | 4/1986 | Gaa et al. | 524/591 |
| 4,618,630 | 10/1986 | Knobel et al. | 521/105 |
| 4,620,944 | 11/1986 | Armand et al. | 252/518 |
| 4,638,017 | 1/1987 | Larson et al. | 521/157 |
| 4,645,924 | 2/1977 | Fogiel | 521/176 |
| 4,687,801 | 8/1987 | Mitani et al. | 524/104 |
| 4,687,802 | 8/1987 | Hepp | 524/411 |
| 4,701,480 | 10/1987 | Markusch et al. | 523/340 |
| 4,734,455 | 3/1988 | Mobley et al. | 524/710 |
| 4,767,825 | 8/1988 | Pazos et al. | 525/408 |
| 4,778,844 | 10/1988 | Blount | 524/706 |
| 4,855,077 | 8/1989 | Shikinami et al. | 524/401 |
| 4,861,805 | 8/1989 | Saavedra et al. | 521/119 |
| 4,886,626 | 12/1989 | Cope et al. | 521/125 |
| 4,912,142 | 3/1990 | Vermeulen et al. | 524/912 |
| 4,920,167 | 4/1990 | Ruetman et al. | 524/779 |
| 4,939,204 | 7/1990 | Efford | 524/912 |
| 5,010,139 | 4/1991 | Yu | 524/910 |

FOREIGN PATENT DOCUMENTS

| | | | |
|---|---|---|---|
| 190476 | 9/1985 | Japan | 524/401 |
| 1334792 | 10/1973 | United Kingdom | 524/401 |

OTHER PUBLICATIONS

European Patent Publication #0142792, Kondo, 5/85, Polyurethane having improved conductivity.

*Primary Examiner*—John Kight, III
*Assistant Examiner*—Rabon Sergent

[57] ABSTRACT

A water reaction synthesis with polyoxyethylene diol, diisocyanate and dibutyltin bis lauryl mercaptide produces a high molecular weight thermoplastic polyurethane-urea linear polymer with surface resistivity $10^{11}$–$10^6$ ohm/sq. Thermoplastic and/or elastomeric antistatic compositions containing other melt processable polymers and/or filler, and the polymer exhibit permanent protection. Antistatic protection can be increased when the polymer complexes with a metal salt such as lithium chloride, or lithium acetate.

29 Claims, No Drawings

CONDUCTIVE POLYURETHANE-UREA/POLYETHYLENE OXIDE

This application is a continuation of application Ser. No. 237,315, filed Aug. 29, 1988.

BACKGROUND OF THE INVENTION

The present invention relates to the preparation and use of novel electrostatic discharge materials. More particularly, the invention relates to the preparation of high molecular weight, linear polyurethane-ureas from diisocyanates, oxyethylene diols and water and the use of these materials in applications in the electrostatic discharge areas.

U.S. Pat. Nos. 3,852,255; 3,891,718; 8,893,979; and 3,911,047 disclose the synthesis of low molecular weight end-capped polyether polyurethanes for use as antistatic additives for fibers to provide surface resistivity values of the order of $10^{10}$ ohm after washing.

European Patent Application 0 142 792 discloses end-capped polyurethane oligomers useful for static dissipative coatings, providing $10^{12}$–$10^{13}$ ohm-cm volume resistivities.

U.S. Pat. No. 3,661,267 discloses using an aqueous bath to apply —CN groups to the surface of a preformed film or fiber to render it antistatic. U.S. Pat. No. 4,029,694 describes an ester/alkylene oxide antistatic agent for melt polymers such as the reaction product of dimethylterephthalate and an ethylene oxide adduct of a propylene oxide adduct of ethylenediamine. None of these references suggest the novel synthesis or polymers of the present invention.

It has long been known that static charges which develop between isolated bodies are discharged when those bodies are brought into sufficiently close proximity or contact. Potentials as high as 30,000 volts have been reportedly generated simply by a person walking on a synthetic carpet. In recent years this phenomenon, always regarded as something of a nuisance, has become a major concern to the manufacturers of sensitive electronic equipment. A static discharge of only a few hundred volts can severely damage or ruin expensive electronic circuitry, and such damage can occur at any stage of the assembly process or during transportation or storage.

Static charges can accumulate on production workers, on assembly work surfaces, and on any of the tools and containers used in the assembly area. The need to prevent static discharge requires that the entire assembly environment be constructed from materials which will quickly dissipate static charge, effectively interconnecting all workers, surfaces and equipment with a common electrical ground.

There are two general classes of materials available for electrostatic discharge (ESD) protection in the electronics industries. The first of these classes is referred to as "conductive" materials, which typically have resistivities in the range of $10^3$ to $10^6$ ohms/square. These materials are typically made of plastics or elastomers which are filled or impregnated with conductive carbon black or metallic substances. In addition to their cost; most of these materials are dark and undecorative and cannot be coated for decoration, wearability or protection without losing their conductive qualities.

Conductive materials can also be made of inherently conductive polymers. Conductive polymers previously known include: polyacetylene, polyphenylene and poly(pyrrole). Dopants such as $AsF_5$, substituted quinones, $FeCl_3$, $HClO_4$, $BF_4$ and iodine are added to improve conductivity. However, stability and compatibility problems as well as high cost and limited availability has limited the applications for these known polymers.

Charge dissipative materials, the second class, typically have resistivities in the range of $10^6$ to $10^{11}$ ohms/square. Most of these materials achieve their electrical conductivities through the use of topical chemicals such as antistats. These chemicals do not normally conduct electricity themselves, instead, they absorb moisture from the air which provides conductivity. Typically antistatic chemicals are small in molecular size. When mixed with plastics, they migrate to the surface and provide conductivity, particularly through moisture absorption.

For these reasons, the previously known charge dissipative materials are sensitive to the humidity of the environment. Furthermore, the performance of the material tends to degrade over time as the antistat which migrates to the surface might be lost by evaporation, cleaning or contact with other objects.

SUMMARY OF THE INVENTION

The present invention provides a material to render thermoplastics and elastomers static dissipative without significant darkening, and without degradation of such static dissipative qualities over time.

The present invention provides a polyurethane-urea/polyethylene oxide linear polymer by reacting 30 to 95 parts by weight of one or more polyethylene oxide diols with 5 to 70 parts by weight aliphatic diisocyanate and 0.1 to 2,000 parts (per 100 parts of total diol and diisocyanate) of water wherein the polymer dissipates static in a thermoplastic or elastomeric composition.

It is preferred that the polymer comprise 40 to 90% polyethylene oxide and be employed in combination with filler within a thermoplastic composition.

A method for producing a linear, high molecular weight, static dissipative polyurethane-urea/ polyethylene oxide polymer comprises the steps:

(a) reacting a polyoxyethylene diol and an equivalent excess of an aliphatic diisocyanate in the presence of a tin catalyst to form a prepolymer, (b) mixing the prepolymer with water, and (c) heating to form a polymer.

A process for preparing a static dissipative material comprises the steps:

(1) preparing a linear polyurethane-urea/ polyethylene oxide polymer, (2) mixing the polymer with another thermoprocessable polymer, and/or a filler.

Optionally, a metal salt such as lithium acetate or chloride my be added to further enhance conductivity. The metal salt may be introduced via dissolution in the water used in step (b) above.

DETAILED DESCRIPTION OF THE INVENTION

It remained for the advance of the present invention to provide conveniently prepared, colorless charge dissipative polymers with a surface resistivity of $10^{11}$ to $10^6$ ohm/sq to provide permanent antistatic protection for a wide variety of commercially useful thermal processable compositions. Charge dissipative materials prepared with the polymers have retained stable surface resistivities of $10^6$–$10^{11}$ ohm/sq under conditions of heavy wear for almost a year and a half. The polymers are comparatively less sensitive to moisture and are not removed by washing as are most currently used antistatic compounds. The materials can be used without degrading appearance and have excellent filler acceptance. Although the polymers are not believed to form true molecular dispersions with most thermoplastics and/or elastomers, their high molecular weight and linear nature allows excellent compatibility, in a practical sense, with most thermoplastic and elastomer systems. This characteristic also minimizes the migration and loss of the polymer due to contact, providing permanent antistatic properties to the resulting structures.

Thermoplastics which can be blended with the polyurethane-urea of the invention are commercially available or can be prepared by known techniques. Thermoplastics found to be particularly useful in the practice of the invention include Surlyn ® and Elvax ® copolymers from DuPont such as ethylene-methacrylic acid copolymer zinc salt, acrylic acid-ethylene copolymer zinc salt, ethylene-methacrylic acid copolymer sodium salt and ethylene-vinyl acetate copolymer. Other suitable thermoplastics include polyvinyl chloride, polyesters, polyurethanes, polyvinyl alcohols, polyamides, polycarbonate, and polyolefin. Elastomers which can be used with or without thermoplastics include natural and synthetic rubbers or rubber materials generated from latices. A preferred rubber is butadiene-acrylonitrile. Other commercially available elastomers include: neoprene, styrene-butadiene rubber and EPDM (ethylene-propylene diene monomer) rubber. Fillers which can be employed in thermoplastic and/or elastomeric compositions with the copolymers of the invention primarily comprise oxides of silicon, zinc, antimony, aluminum, or titanium and calcium carbonate. Fumed silica, alumina trihydrate, and limestone are preferred fillers, but other commercially available materials such as talc, clay, mica, wollastonite, and feldspar can be conveniently employed.

With respect to the use of fillers, it was unexpected to find that dilution of the composition did not significantly diminish antistatic protection, whereas physical properties are often considerably improved. The insensitivity to filler addition is a particularly important advance provided by the invention. This aspect is just as important from a practical viewpoint as the relative moisture insensitive characteristics of the polymers.

Stabilizers and processing aids can similarly be employed in conductive materials incorporating the polymers of the invention. These include sulfur, stearic acid, metal oxide, organo tin compounds, polyelectrolytes, and sodium silicate. While not being exhaustive, these may serve to suggest other materials or processes beneficial in combination with the new copolymers of the invention.

It is an advantage that the urethane-urea/polyethylene oxide polymers can be prepared without organic solvent, avoiding environmental precautions otherwise required. Variation in starting materials of the preparations illustrated below can produce polyurethane-urea/-polyethylene oxides suitable for the practice of the invention. Equivalent reactants which produce substantially the same linear polymers are considered to be within the scope of the invention.

The novel synthetic method of the present invention allows the production of high molecular weight linear polymers with unique antistatic, processing and compatibility properties. Since the reaction of the prepolymer with water to form an amine is a slow reaction and the following reaction of the amine with isocyanate is relatively fast, the molecular weight of the polymer formed is relatively insensitive to the amount of water. Although the amount of water which actually reacts is less than three parts by weight, large excesses of water may be used since it does not interfere with attaining the desired molecular weight, and simply acts as a plasticizer and/or suspending agent for the polyurethane-urea. The presence of water further allows a convenient way to incorporate metal salts to be complexed to the polymer during the synthesis, thereby generating an even more conductive end product.

The synthetic method of the present invention provides a superior antistatic composition when 40 to 80% polyethylene oxide is incorporated in a polymer with a weight average molecular weight (Mw) of about 30,000 or higher, either with or without complexed metal salt.

The method of the invention can be illustrated by the following:

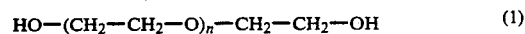

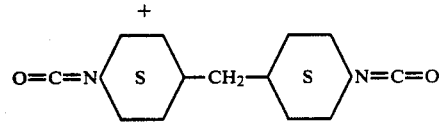

(urethane prepolymer)

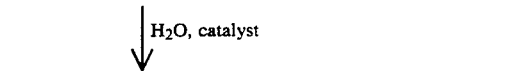

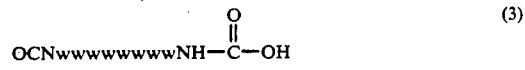

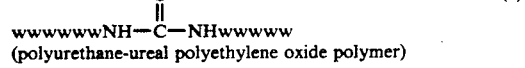

(polyurethane-ureal polyethylene oxide polymer)

In (1), addition occurs wherein an alcohol is added across the C=N bond to form a linear NCO terminated urethane prepolymer (2).

When (2) is reacted with water in the presence of a tin catalyst, such as dibutyltin bis lauryl mercaptide, the terminal NCO group is converted to a carbonic acid to form the intermediate (3). Decarboxylation then produces an amine (4) which can react upon formation with a terminal NCO. While the reaction with water is relatively slow the amine groups react rapidly upon formation to chain extend the prepolymer via formation of urea groups, leading eventually to high molecular weight linear polyurethane urea (5).

Because the reaction of NCO with water is so much slower than the reaction with amine, there is no danger of termination, even when a large excess of water is employed. Thus, the discovery of this route to high molecular weight, linear, conductive polymers provides an advance in the state of the art wherein the use of water expedites the formation of high molecular weights and allows the covenient addition of metal salts which further enhance conductivity. It should also be noted that in many formulations, it is possible to incorporate the prepolymer and simply allow the formation of the high molecular weight polymer to occur gradually at ambient conditions, since the prepolymer reacts with atmospheric moisture.

The present invention has industrial applicability for materials in the field of ESD (Electrostatic Discharge). Thermoplastic, elastomeric and combination materials thereof can be made antistatic by incorporation of polyurethane-urea/polyethylene oxides and/or their metal salt complexes.

In the following examples, surface resistivity measurements were conducted according to ASTM D-257 using an Electrotech Systems Inc. Resistivity Probe (Model 802) "IKE PROBE". An 11-lb. weight applied force to the probe for all measurements. A Dr. Theidig Milli-To wide range resistance meter was connected to the probe for direct digital readout of resistance. The tests conducted at 50% RH were set up in a room controlled at 50±1% RH and 23±1° C. temperature. The tests conducted at 15% RH were set up in a dry box controlled at 14±2% RH and 23 ±1° C. temperature.

The following preparations and examples illustrate the practice of the invention of which Example 10 illustrates the Best Mode.

EXAMPLES

Polyurethane-urea/Polyethylene Oxide, Preparation A

A one liter (1l.) flask was charged with 1 eq. or five hundred grams (500 g.) of a polyoxyethylene diol purchased from the Union Carbide Corp. under the tradename Carbowax ® 1000. After heating this material to 50° C., 1.6 eqs. or two hundred and ten grams (210 g.) of [methylene bis(4-cyclohexylisocyanate)], available from the Mobay Chemical Co. under the tradename Desmodur ® W, and three and fifty-five one-hundredths grams (3.55 g.) dibutyltin bis lauryl mercaptide, available from the Metal and Thermit Corp. with the trade designation T-20, were added in quick succession. The temperature was then raised to 115° C. and held there for 80 minutes in order to form an —NCO terminated prepolymer.

The reaction mixture, at 115° C., was then poured into a 1 gallon capacity plastic tub containing fourteen grams (14 g.) of deionized water. The resulting mixture was stirred, covered and placed in a 60° C. oven for 20 hours.

The resulting polymer which was taken from the tub was a white rubbery foam which could be consolidated to a solid elastomer sheet on a rubber mill. Gas Permeation Chromatography (GPO) weight average molecular weight (polystyrene calibration) was determined to be about 74,000.

Polyurethane-urea/Polyethylene Oxide, Preparation B

Following the procedure of preparation A, a polymer determined to have a GPC weight average molecular weight (polystyrene calibration) of about 43,000 was prepared from the following compounds:

Polyoxyethylene diol (Carbowax ® 1450-Union Carbide) 725 grams (1.0 eqs.)

[methylene bis(4-cyclohexylisocyanate)](Desmodur ® W, Mobay Chemical): 223 grams (1.7 eqs.)

dibutyltin bis lauryl mercaptide (T-20, Metal and Thermit Corp.): 4.74 grams deionized water: 19.0 grams The polymer had a surface resistivity of 107 ohm/sq. at 50% R.H.

POLYURETHANE-UREA PREPARATION C

Doping with metal salt)

A five liter flask was charged with 1859 gms. (2.56 eqs.) of a polyoxyethylene diol of approximately 1450 number average molecular Weight, purchased from Union Carbide Corp. under the trade name, Carbowax ® 1450, 0.486 gms. of 2,5di-tert-butylhydroquinone antioxidant, and one drop of an antifoam obtained from Crucible Chemical Co. under the tradename Foamkill ® 8R. After heating to 50° C. under dry nitrogen, 4.46 eqs. or 571.5 gms. of methylene bis(4-cyclohexylisocyanate) and 12.15 gms. of dibutyltin bis lauryl mercaptide were added in quick succession. The temperature was then raised to 115° C. and held there for 30 minutes. The prepolymer thus formed, was cooled to 75° C. and 600 gms. of same was poured into each of four one gallon capacity plastic tubs each of which contained 147.5 gms. of a 40% aqueous solution of lithium acetate. These mixtures were stirred with a large spatula, let stand in a fume hood for one hour, then covered and placed in a 60° C. oven for 20 hours. The resulting polymer was removed from the tub as a white rubbery foam (plasticized by water) which could be partially dried and consolidated to a solid elastomeric sheet on a rubber mill. GPO weight average molecular weight (polystyrene calibration) was found to be 80,400.

Silicate/NBR Latex Coprecipitate, Preparation D

A 240 g portion of a carboxylated NBR latex (Reichlold Chemical 68-513) was added to a vessel containing 3000 cc of water. After a brief stirring, 211 g of sodium silicate (28% $SiO_2$ aqueous solution) was added. To precipitate the silicate and the latex, 400 cc of 1M calcium chloride solution was added to the silicate/latex solution while stirring. Stirring was continued until a clear supernatant was obtained in about five minutes. Water was drained off and the precipitated silicate/latex material was dryed in an oven at 200° F. A dry powder was obtained in which silicate (about 60 phr) was well distributed throughout the NBR.

EXAMPLE 1

Samples were prepared. Fifty grams (50 g.) of a ethylene-acrylic acid copolymer neutralized with a sodium salt available commercially from the E. I. duPont de Nemours Co. (DuPont) under the trade-mark Surlyn ® 8920, was milled on a two-roll mill which had been preheated to between 280° F. and 300° F. until a continuous film was formed. At this point, a 25 or 50 g portion of the polymer of Preparation B as shown in Table 1 was added and the milling operation continued until a uniform blended structure was obtained. Finally, fifty grams (50 g.) of ethylene propylene diene monomer rubber (EPDM), available commercially from DuPont under the tradename Nordel ® 2744, was added to the mill rolls and blending continued until the structure was homogeneously mixed.

The blended structure was subsequently taken off the mill rolls and heat pressed at 820° F. for five minutes in a stainless steel frame. Surface resistivities (Rs) and volume resistivities (Rv) as measured in accordance with ASTM D-257 method for the structures are also given in Table 1.

TABLE 1

| Sample | Preparation B (grams) | Surface Resistivity (Rs) (ohms/square) | Volume Resistivity (Rv) (ohm-cm) |
| --- | --- | --- | --- |
| A | 0 | $>10^{13}$ | $>10^{14}$ |
| B | 25 | $1.9 \times 10^{10}$ | $2.4 \times 10^{10}$ |
| C | 50 | $7.5 \times 10^{9}$ | $8.0 \times 10^{8}$ |

EXAMPLE 2

Following the procedure of Example 1, a sample was prepared with one hundred grams (100 g.) of Surlyn ® 8920, fifty grams (50 g.) of the polymer of Preparation B and one hundred grams (100 g.) of EPDM. However, after the addition of the polymer of Preparation B and prior to the addition of the EPDM, five grams of an anionic polyelectrolyte commercially available from the Uniroyal Chemical Co. under the tradename Polywet ® KX4 was added to the mill rolls.

The blended structure obtained was measured to have a surface resistivity of $9.75 \times 10^{9}$ ohms/square and a volume resistivity of $2.5 \times 10^{9}$ ohm-cm.

EXAMPLE 3

Following the procedures of Examples 1 and 2, a sample was prepared containing fifty grams (50 g.) of Surlyn ® 8920, fifty grams (50 g.) of the polymer of Preparation B, fifty grams (50 g.) of Nordel ® 2744, and ten grams (10 g.) of anionic polyelectrolyte Polywet ® KX4. In addition, one hundred grams of crushed limestone (325 Mesh) were added and mixed with the composition on the mill rolls.

The resulting structure was determined to have a surface resistivity (Rs) of $2.2 \times 10^{9}$ ohms/square and a volume resistivity (Rv) of $1.2 \times 10^{8}$ ohm-cm.

The sample was then stored in a normal room environment for six months and the resistivities were again determined. After such storage, the sample was determined to have a surface resistivity (Rs) of approximately $10^{9}$ ohms/square and a volume resistivity (Rv) of approximately $10^{8}$ ohms-cm.

EXAMPLE 4

Samples were prepared from the following components in grams.

| | Sample | | |
| --- | --- | --- | --- |
| | A | B | C |
| Uncured nitrile rubber (g.) | 150 | 150 | 150 |
| Preparation B Polymer (g.) | 0 | 50 | 50 |
| Fumed Silica Particles (Aerosil ® 200 from Deguassa) (g.) | 60 | 60 | 60 |
| Aluminum Trihydrate (g.) | 0 | 0 | 100 |
| Zinc Oxide (parts per hundred parts rubber) | 5.0 | 5.0 | 5.0 |
| Stearic Acid (parts per hundred parts rubber) | 1.0 | 1.0 | 1.0 |
| MBTS (Altex) (pphr.) | 1.5 | 1.5 | 1.5 |
| TMTD (pphr.) | 1.0 | 1.0 | 1.0 |
| Sulfur (pphr.) | 3.0 | 3.0 | 3.0 |

The uncured nitrile rubber was first blended into a sheet structure using a two-roll mill preheated to about 250° to 270° F. Then the appropriate amount of Preparation B polymer was added, followed by the fumed silica particles and the aluminum trihydrate, as appropriate. The milling operation continued until the compositions were homogeneously mixed. The remaining ingredients, representing a sulfur curing package, was added to each. The blended structure was then taken from the mills rolls and heated pressed and cured in a stainless steel frame at 320° F. for 20 minutes. The structures exhibited the following resistivities:

| | Sample A | Sample B | Sample C |
| --- | --- | --- | --- |
| Surface Resistivity (Rs) (ohms/sq.) | $3.2 \times 10^{13}$ | $7.9 \times 10^{9}$ | $5.0 \times 10^{10}$ |
| Volume Resistivity (Rv) (ohm-cm) | $2.5 \times 10^{14}$ | $3.4 \times 10^{9}$ | $4.9 \times 10^{9}$ |

EXAMPLE 15

Employing the same processing as in Example 4, samples were prepared of the following compositions, in grams:

| | Sample 5A | Sample 5B |
| --- | --- | --- |
| NBR Rubber | 75 | 75 |
| Surlyn ® 8920 | 50 | 50 |
| Preparation B Polymer | 30 | 30 |
| Fumed Silica (Aerosil ® 200) | 30 | 30 |
| Aluminum Trihydrate | — | 50 |
| Surface Resistivity (Rs) (Ohms/sq.) | $1.7 \times 10^{9}$ | $2.5 \times 10^{9}$ |

EXAMPLE 6

Employing the procedure of Example 3, samples were prepared of the following compositions, in grams.

| | Sample 6A | Sample 6B |
| --- | --- | --- |
| Ethylene/vinyl acetate copolymer (Elvax ® 360 from Dupont) | 150 | 150 |
| Preparation B Polymer | 50 | 50 |
| Fumed Silica (Aerosil ® 200) | 60 | 60 |
| Anionic Polyelectrolyte (Polywet ® 1766 from Uniroyal) | — | 10 |
| Surface Resistivity (Rs) (Ohms/sq.) | $5 \times 10^{10}$ | $1.5 \times 10^{10}$ |

EXAMPLE 7

Following the procedure outlined in the above Examples, samples were prepared of the following compositions, in grams.

| | Sample 7A | Sample 7B |
| --- | --- | --- |
| Ethylene/vinyl acetate copolymer (Elvax ® 360 from DuPont) | 50 | 50 |
| | 50 | 50 |
| NBR Rubber | 75 | 75 |
| Preparation B Polymer | 30 | — |
| Fumed Silica | 30 | 30 |
| Surface Resistivity (Rs) (Ohms/sq.) | $2.1 \times 10^{10}$ | $10^{13}$ |

EXAMPLE 8

Samples were prepared of the following compositions, in grams:

| | | | | | | | | | | | |
|---|---|---|---|---|---|---|---|---|---|---|---|
| Preparation D Powder | 160 | 160 | 160 | 160 | 160 | 160 | 160 | 160 | 160 | 160 | 160 |
| Anionic Polyelectrolyte (Polywet ® KX4) | 10 | 10 | 10 | 10 | 10 | 10 | 10 | 10 | 10 | 10 | 10 |
| Prep. A Polymer | 20 | — | 50 | 50 | 50 | 50 | 50 | 50 | 50 | 50 | 50 |
| Prep. B Polymer | — | — | — | — | — | — | — | — | — | 50 | 50 |
| Aluminum Silicate | — | — | — | 25 | 50 | 75 | — | — | — | 50 | — |
| Mica | — | — | — | — | — | — | 50 | — | — | — | — |
| Clay | — | — | — | — | — | — | — | 50 | — | — | — |
| Aluminum Trihydr. | — | — | — | — | — | — | — | — | 50 | — | 100 |
| $R_S$ (ohm/square) $\times 10^{-10}$ | 9.3 | 35.0 | 0.89 | 4.5 | 3.9 | 7.4 | 6.9 | 2.5 | 2.1 | 0.36 | 0.3 |
| $R_V$ (ohm-cm) $\times 10^{-9}$ | 5.2 | 52.0 | 0.94 | 1.6 | 4.7 | 3.1 | 3.9 | 4.1 | 2.0 | 0.35 | 0.42 |

All of these samples maintained resistivities on the same order of magnitude one year after their preparation. The second sample which did not contain the polymers of the invention served as a control and gave the highest resistivities.

EXAMPLE 9

Control (A) and experimental (B'C, D, E) tile formulations were prepared with the following ingredients:

| | Sample | | | | |
|---|---|---|---|---|---|
| | A | B | C | D | E |
| PVC Resin | 36.3 | 36.3 | 36.3 | 36.3 | 36.3 |
| Di-2-ethylhexyl-phthalate | 6.0 | 6.0 | 6.0 | 6.0 | 6.0 |
| Stabilizer (Melamine base with a metallic soap) | 1.8 | 1.8 | 1.8 | 1.8 | 1.8 |
| $TiO_2$ | 2.34 | 2.34 | 2.34 | 2.34 | 2.34 |
| $CaCO_3$ | 244.30 | 244.30 | 244.30 | 244.30 | 244.30 |
| Processing aid (Alpha-methyl-styrene) | 3.0 | 3.0 | 3.0 | 3.0 | 3.0 |
| Preparation B | 0 | 20.0 | 20.0 | 20.0 | 20.0 |
| LiCl (40% in methanol) | 0 | 0 | 25.0 | 12.5 | 7.5 |

The LiCl in methanol and the polyurethane-urea/PEO copolymer from preparation B were first mixed on a two roll mill which was preheated to 260°–280° F. After the methanol was evaporated and the mixture thoroughly mixed, other ingredients were added and the milling operation continued until a homogeneous composition resulted. The sheet structure generated from the milling operation was subsequently heat-pressed at 320° F. for five minutes to form tile materials Surface resistivities were measured after cooling samples at ambient condition (40% RH, at 70° F.). Table 2 shows the resistivity results.

| Sample | Resistivity, ohm/sq (per ASTM D-257 method) |
|---|---|
| A | $>10^{13}$ |
| B | $4.5 \times 10^9$ |
| C | $1.2 \times 10^6$ |
| D | $3.5 \times 10^6$ |
| E | $6.9 \times 10^6$ |

Samples C, D, and E were later placed in a humidity controlled chamber and conditioned at 12±3% RH at 70° F. for 48 hours. After the conditioning, all three samples still exhibited surface resistivities no higher than $10^7$ ohm/sq. Sample D was taped down on a floor substrate and evaluated for long-term performance with respect to traffic. After 18 months of traffic wear and periodic washing and cleaning, the resistivity of the sample still showed $6 \times 10^6$ ohm/sq at 40%–45% RH 78° F.

EXAMPLE 10

Tiles were prepared using a vinyl composition as in Example 9 except that only 10 parts of the polyurethane-urea/PEO with lithium acetate from Preparation C were used. A control sample without the polymer and lithium acetate had a surface resistivity greater than $10^{13}$ ohm/sq. while samples prepared according to this invention gave a surface resistivity of $1.1 \times 10^7$ ohm/sq conditioned at 50% RH, 72° F. for 48 hours and $4.6 \times 10^8$ ohm/sq conditioned at 15% RH, 72° F. for 72 hours.

What is claimed is:

1. A solid, metal salt complexed, thermoplastic, conductive polyurethane-urea/polyethylene oxide polymer comprising the reaction product of (a) 30 to 95 parts by weight polyethylene oxide diol per one hundred parts of diol and diisocyanate, (b) 5 to 70 parts by weight aliphatic diisocyanate per one hundred parts of doil and diisocyanate and (c) 0.1 to 2,000 parts water per one hundred parts of diol and diisocyanate.

2. The polymer of claim 1 wherein the polyurethane-urea/polyethylene oxide polymer comprises 40 to 90 parts by weight polyethylene oxide diol per one hundred parts of diol and diisocyanate.

3. The polymer of claim 2 having a surface resistivity of $10^6$ to $10^8$ ohm/sq.

4. The polymer of claim 3 having a weight average molecular weight of at least about 30,000.

5. The polymer of claim 1 wherein the metal salt is lithium chloride or lithium acetate.

6. A conductive composition comprising the polymer of claim 1 wherein sufficient water is present to form a solid suspension.

7. The polymer of claim 1 wherein (c) is 0.1 to 3 parts water per one hundred parts of diol and diisocyanate.

8. The polymer of claim 1 wherein the aliphatic diisocyanate is selected from the group consisting of 1,6-hexamethylene diisocyanate and tetramethylxylene diisocyanate.

9. A static dissipative material comprising the polymer of claim 1 and a thermoplastic or an elastomer.

10. A method of producing a solid, metal salt complexed, thermoplastic, conductive polyurethane-urea/polyethylene oxide polymer comprising reacting a polyethylene oxide diol, an aliphatic diisocyanate and water, the diol being 30 to 95 parts by weight per one hundred parts of diol and diisocyanate, the diisocyanate being 5 to 70 parts by weight per one hundred parts of diol and diisocyanate, and the water being 0.1 to 2,000 parts per one hundred parts of diol and diisocyanate.

11. The method of claim 10 wherein the diol comprises 30 to 90% by weight of the final product.

12. The method of claim 10 wherein the polyurethane-urea/polyethylene oxide polymer has a weight average molecular weight of about 30,000-80,000.

13. The method of claim 12 wherein (a) the diol and diisocyanate are reacted in the presence of a tin catalyst to form a liquid prepolymer, (b) water is mixed with the prepolymer, and (c) the prepolymer and water are heated to form the polymer.

14. The method of claim 10 wherein the metal salt is lithium chloride or acetate.

15. The method of claim 10 wherein the water is 0.1 to 3 parts per one hundred parts of diol and diisocyanate.

16. The method of claim 10 wherein the diol, diisocyanate and water are reacted in the presence of the metal salt.

17. The method of claim 10 wherein the aliphatic diisocyanate is selected from the group consisting of 1,6-hexamethylene diisocyanate and tetramethylxylene diisocyanate.

18. A process for preparing a static dissipative material comprising preparing a linear polyurethane-urea/polyethylene oxide polymer by the method of claim 10 and mixing the polymer with another thermoplastic or an elastomer.

19. A method of producing a solid, metal salt complexed, thermoplastic, conductive polyurethane-urea/polyethylene oxide polymer comprising reacting a polyethylene oxide diol, methylene bis(4-cyclohexylisocyanate) and water, the diol being 30 to 95 parts by weight per hundred parts of diol and diisocyanate, the methylene bis(4-cyclohexylisocyanate) being 5 to 70 parts by weight per one hundred parts of diol and diisocyanate, and the water being 0.1 to 2,000 parts per one hundred parts of diol and diisocyanate.

20. A static diisipative floor covering comprising a solid, thermoplastic polyurethane-urea/polyethylene oxide polymer which is the reaction product of (a) 30 to 95 parts by weight polyethylene oxide diol per one hundred parts diol and diisocyanate, (b) 5 to 70 parts aliphatic diisocyanate per one hundred parts of diol and diisocyanate and (c) 0.1 to 2,000 parts water per one hundred parts of diol and diisocyanate.

21. The floor covering of claim 20 wherein the polyurethane-urea/polyethylene oxide polymer is mixed with a polyvinylchloride resin.

22. The floor covering of claim 20 wherein (c) is 0.1 to 3 parts water per one hundred parts of diol and diisocyanate.

23. The floor covering of claim 20 wherein the aliphatic diisocyanate is selected from the group consisting of 1,6-hexamethylene diisocyanate and tetramethylxylene diisocyanate.

24. The floor covering of claim 20 further comprising a complexed metal salt.

25. The floor covering of claim 24 wherein the metal salt is lithium chloride or lithium acetate.

26. The floor covering of claim 24 with a surface resistivity below $5 \times 10^7$ ohm/sq at 50% RH.

27. The floor covering of claim 24 having a surface resistivity below $10^{10}$ ohm/sq. at 50% RH.

28. A solid, metal salt complexed, thermoplastic, conductive polyurethane-urea/polyethylene oxide polymer comprising the reaction product of (a) 30 to 95 parts by weight polyethylene oxide diol per one hundred parts of diol and diisocyanate, (b) 5 to 70 parts by weight methylene bis(4-cyclohexylisocyanate) per one hundred parts of diol and diisocyanate and (c) 0.1 to 2,000 parts water per one hundred parts of diol and diisocyanate.

29. A static dissipative floor covering comprising a solid, thermoplastic polyurethane-urea/polyethylene oxide polymer which is the reaction product of (a) 30 to 95 parts by weight polyethylene oxide diol per one hundred parts of diol and diisocyanate, (b) 5 to 70 parts by weight methylene bis(4-cyclohexylisocyanate) per one hundred parts of diol and diisocyanate and (c) 0.1 to 2,000 parts water per one hundred parts of diol and diisocyanate.

* * * * *

UNITED STATES PATENT AND TRADEMARK OFFICE
CERTIFICATE OF CORRECTION

PATENT NO. : 5,077,330
DATED : December 31, 1991
INVENTOR(S) : Wendell A. Ehrhart et al.

It is certified that error appears in the above-identified patent and that said Letters Patent is hereby corrected as shown below:

Column 1, line 17, the number "8,893,979" should read --3,893,979--.
Column 1, line 26, the number "3,661,267" should read --3,661,627--.
Column 5, line 47, the number "80" should read --30--.
Column 5, line 57, the letters "(GPO)" should read --(GPC)--.
Column 6, line 7, the number "107" should read --$10^7$--.
Column 6, line 21, the number "4.46" should read --4.36--.
Column 6, line 35, the letters "GPO" should read --GPC--.
Column 7, line 2, the number "820° F." should read --320° F.--.
Column 8, line 22, "Example 15" should read --Example 5--.
In the claims:
Claim 1, column 10, line 36, the word "doil" should read --diol--.

Signed and Sealed this

Twentieth Day of April, 1993

Attest:

MICHAEL K. KIRK

*Attesting Officer*    Acting Commissioner of Patents and Trademarks